Sept. 10, 1935.  A. PELTZER ET AL  2,013,668
MATERIAL TREATMENT METHOD, APPARATUS AND SYSTEM
Filed Jan. 15, 1932  3 Sheets-Sheet 3
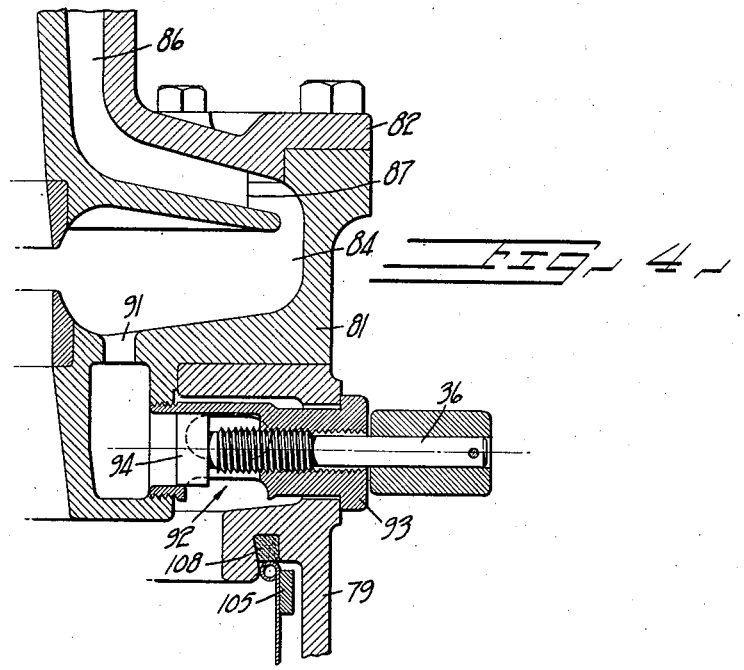
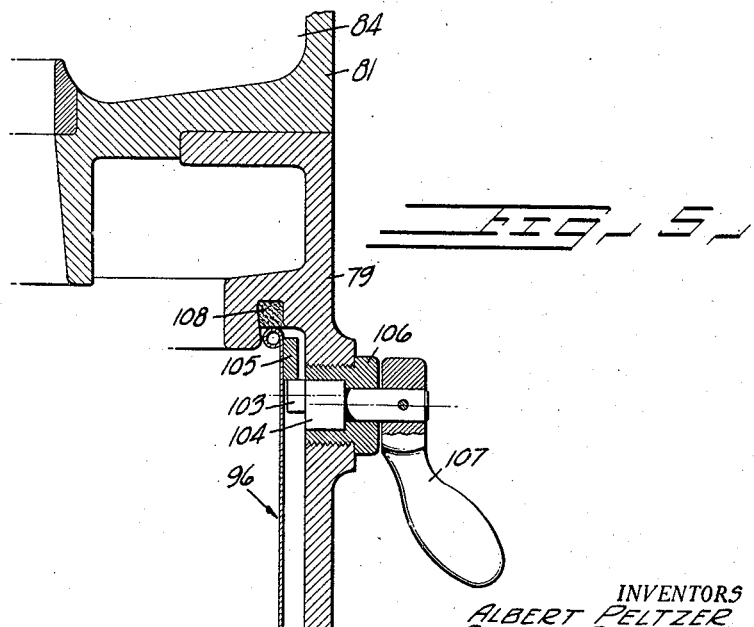
INVENTORS
ALBERT PELTZER
ALBERT PELTZER JR.
BY
ATTORNEYS.

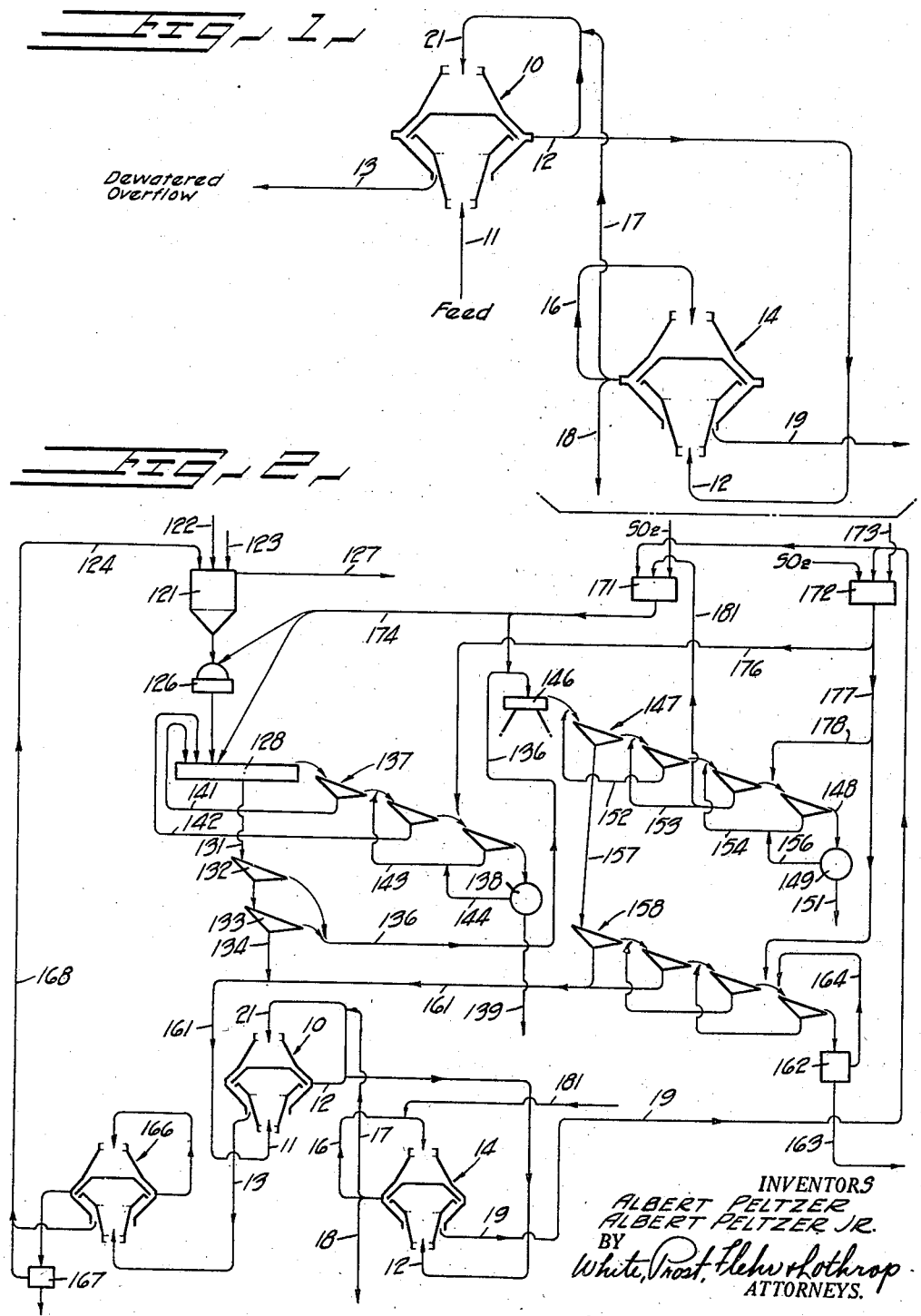

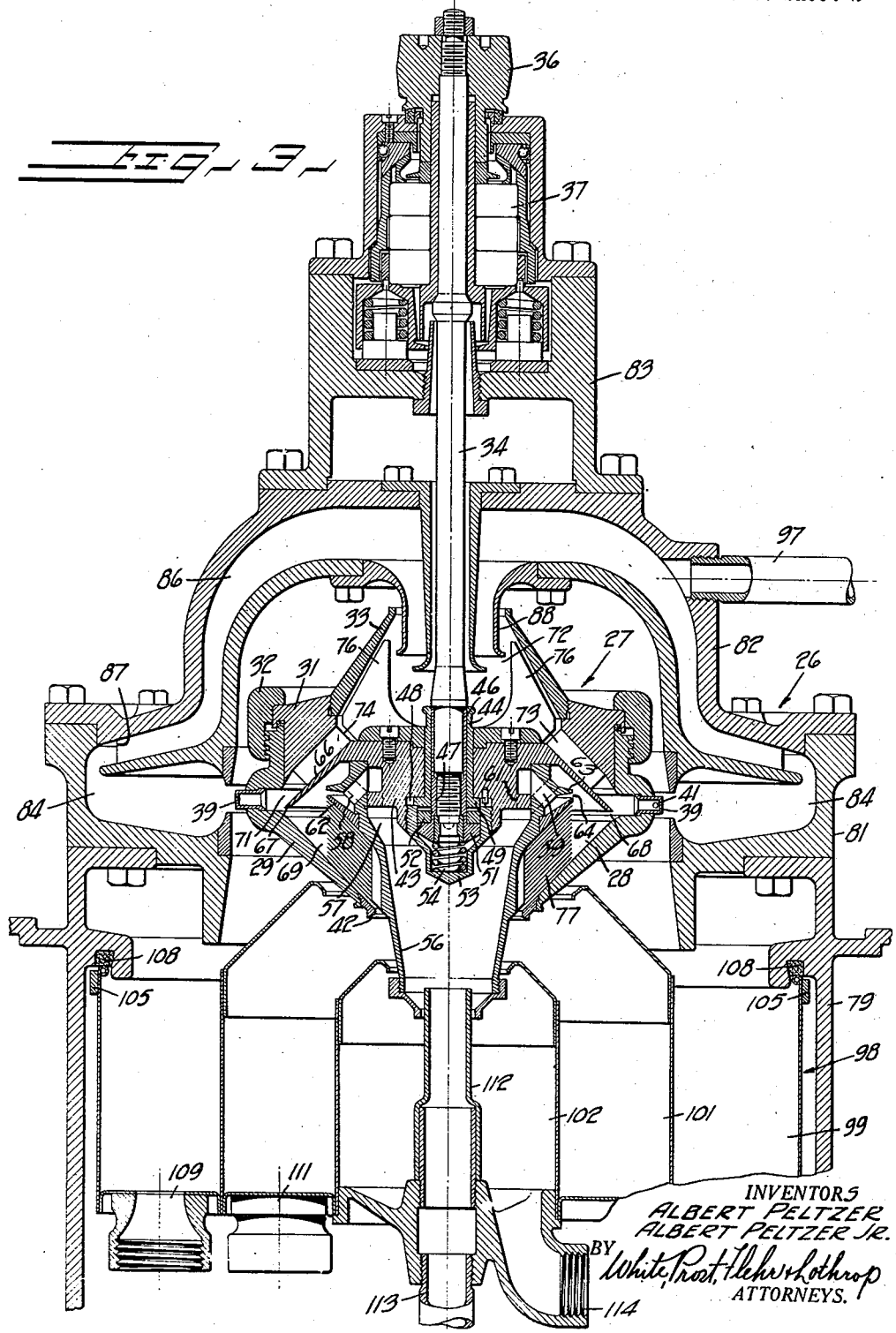

Patented Sept. 10, 1935

2,013,668

UNITED STATES PATENT OFFICE 2,013,668

MATERIAL TREATMENT METHOD, APPARATUS, AND SYSTEM

Albert Peltzer and Albert Peltzer, Jr., Palo Alto, Calif., assignors to Merco Centrifugal Separator Co. Ltd., San Francisco, Calif., a corporation of California Application January 15, 1932, Serial No. 586,773

10 Claims. (Cl. 127—67)

This invention relates generally to a method and apparatus for effecting separation of components having different classifying characteristics from various feed materials, particularly those containing colloids. It also relates to systems for the commercial manufacture of starch from starch bearing materials such as Indian corn.

In the manufacture of commercial starch, as for example, from Indian corn, it has been common to treat the corn by successive stages to form what is known as "mill starch". This treatment generally includes steeping the corn in vats with water at an elevated temperature and subsequent removal of germs and fibrous material from the milled starch. The mill starch contains gluten principally in colloidal form, together with starch particles and water. The mill starch is then treated to a separating process, commonly known as tabling, to separate the starch from the gluten. The separated starch together with water in which the starch particles are suspended, which can be termed as underflow from the tabling process, is then further treated in suitable filters or like means to separate the starch from the water. Likewise, the gluten separated from the milled starch, which can be termed a gluten overflow, is treated as by settlers and filter presses for the removal of gluten. The overflow from the gluten settlers still contains considerable soluble gluten.

As the above outline system is utilized at present in the corn products industry, large quantities of the wash water are utilized in the successive treatment stages. To conserve water consumption, part of the overflow liquids can be reintroduced into the system, for example, to aid in effecting removal of fibrous material. Likewise, it is desirable to return the gluten settler overflow into the system, not only to conserve water consumption, but also to better the recovery of gluten. However, as practiced in the past, the gluten settler overflow has such a low concentration, that is, it contains such a large quantity of water, that only a minor portion of it can be introduced into the steeping vats to supply the water for steeping the corn. Furthermore, the tabling methods previously utilized for separation of gluten from the mill starch have been relatively slow and inefficient, and required elaborate apparatus.

It is an object of the invention to devise a method for the efficient separation of suspended solid particles and colloids, from feed materials like mill starch.

It is a further object of the invention to devise a method and system for the manufacture of starch which will serve to produce a starch product of relatively high quality compared to starch which has been manufactured by prior systems and methods.

It is another object of the invention to devise a method and system of the above character which would not be unduly wasteful in the utilization of water and which will cause the gluten bearing water resulting from the treatment of the mill starch to have such a small quantity of water that substantially all of this water can be utilized in the steeping vats.

A further object of this invention is to devise a centrifuge method and apparatus which will make possible the discharge of a relatively dewatered overflow compared to prior centrifuge apparatus and methods of the past.

Further objects of the invention will appear from the following description in which the preferred embodiment of the invention has been set forth in detail in conjunction with the accompanying drawings. It is to be understood that the appended claims are to be accorded a range of equivalents consistent with the state of the prior art.

Referring to the drawings:

Figure 1 is a schematic diagram illustrating our method for effecting dewatering of the overflow of a centrifuge apparatus.

Figure 2 is a schematic diagram of flow sheet illustrating a complete system for the manufacture of cornstarch, and utilizing as a part thereof the method illustrated in Figure 1.

Figure 3 is a side elevational view in cross-section, illustrating a centrifuge apparatus which can be utilized in the method illustrated in Figure 1.

Figure 4 is a cross-sectional detail illustrating a part of the centrifuge apparatus of Figure 3, and including a valve for controlling the rate of removal of underflow.

Figure 5 is a cross-sectional detail illustrating suitable means for detachably securing the lower receiving receptacles of the centrifuge apparatus to the main part of the structure.

Referring first to Figure 1, we have diagrammatically indicated a centrifuge 10 which is preferably of a type to be presently explained in detail. Introduction of feed material into centrifuge 10 is indicated by line 11, underflow discharged therefrom by line 12, while the overflow discharge is indicated by line 13. In conjunction with centrifuge 10 there is a concentrating apparatus shown diagrammatically at 14, which can likewise be a centrifuge similar to centrifuge 10. Feed into centrifuge 14 is indicated by line 12, the underflow discharge by lines 16, 17 and 18, while the overflow discharge is indicated by line 19. As indicated by line 21, a portion of the underflow discharge from centrifuge 10 is returned back into the centrifuge chamber. The remainder constitutes a feed for centrifuge 14. A portion of the underflow discharge from centrifuge 14 is reintroduced into centrifuge 10 as represented by line 17, and another part is split between the return 16 and line 18 for final delivery.

Before describing in detail the results accomplished by the method illustrated in Figure 1, it is necessary to first describe the preferred construction for centrifuge 10. Referring to Figures 3 to 5 inclusive, the centrifuge illustrated therein consists of a housing indicated generally at 26, within which there is a rotating structure 27. Structure 27 is formed to provide a centrifuge chamber 28 adapted to receive a fluid feed material, and which is also adapted for the separate discharge of centrifugally separated underflow and overflow. For manufacturing convenience, the structure 27 is formed of a plurality of parts, one part 29 forming the lower part of the structure, another annular part 31 which is secured to part 29 by ring 32, and an upper conical part 33 which is secured to part 31 by means of a threaded engagement. The entire structure 27 is mounted on the lower end of a drive shaft 34, the upper end of this shaft being supplied with a drive pulley 36 and being supported by suitable bearing 37.

For enabling the discharge of the underflow, that is, the heavier separated material from the chamber 28, we provide tubular nozzles 39 which are at circumferentially spaced points in the sides of the wall of part 29. These nozzles 39 have discharge orifices 41 directed backwardly with respect to direction of rotation of structure 27. The overflow, that is, the lighter centrifugally separated material, is adapted to be discharged over an annular weir 42, formed at the lower end of part 29.

For a proper understanding of the provision for introducing feed material in the centrifuge chamber, it will be necessary to describe the structure interposed between the lower end of shaft 34 and the outer portion of structure 27. It will be noted that part 31 is provided with an inner hub 43 which surrounds the lower end of shaft 34. Interposed between shaft 34 and hub 43, there is a pair of interfitting sleeves 44 and 46. Sleeve 46 is secured to shaft 34 by a threaded connection 47. The lower side of hub 43 is provided with a counterbore 48 to accommodate an annular shoulder 49, formed on the lower end of sleeve 44. At the lower end of sleeve 46 is likewise provided an annular shoulder 51, and interposed between shoulders 49 and 51 there is a slip ring 52. A cap 53 is threaded into counter bore 48 and interposed between this cap and the lower end of sleeve 46, there is a compression spring 54. Compression spring 54 serves to urge shoulders 49 and 51 together upon the faces of ring 52, so as to form a universal joint.

Depending from hub portion 43 there is an inverted, truncated, conical section 56 into which feed material is adapted to be introduced as will be presently explained. The upper part of section 56 forms together with hub 43, an annular feed chamber 57. From feed chamber 57 the feed material is delivered into the centrifuge chamber 28 through two different sets of ports or ducts. One set of ducts 58 is spaced circumferentially and is inclined upwardly and outwardly. Another set of ducts 59 is likewise spaced circumferentially, but is staggered with respect to ducts 58 and is inclined downwardly and outwardly. The inner end of ducts 59 communicate with the ducts 61. Adjacent the discharge ends of ducts 58 there is an inverted conical deflector 62, which together with an annular lip 63 serves to form an annular discharge orifice 64 for feed material. Therefore, material being discharged through ducts 59 is deflected upwardly and outwardly by deflector 62 and is discharged through the centrifuge chamber through the orifice 64.

In order to cause all of the feed material discharged through annular orifice 64 and ducts 58 to flow outwardly and downwardly, towards the periphery of the centrifuge chamber along a conical surface, we provide a truncated conical wall portion 66 which may be integral with hub 43 and part 31. The outer edge 67 of portion 66 is so positioned as to form an annular opening 68 through which material must flow as it passes through the chamber by centrifugal force. Wall portion 66 therefore in effect divides the centrifuge chamber into two portions 69 and 71, the portion 71 being in direct communication with the discharge nozzles 39. Chamber portion 71 is also in communication with an upper auxiliary feed chamber 72, through downwardly and outwardly inclined passages 73, separated by webs 74. Feed chamber 72 is adapted to receive heavier material previously discharged from the centrifuge chamber, and to deliver the same back into the chamber portion 71 by way of passages 73. To impart rotary energy to material in feed chamber 72, we preferably provide vanes 76 which can be suitably mounted upon the upper face of hub 43.

To aid in effecting efficient separation, we preferably provide a plurality of spaced conical discs 77 disposed within the chamber portion 69, and concentric with the axis of shaft 34.

To properly understand the manner in which the feed material is introduced into the rotating structure 27 and the centrifuge chamber, how the underflow and overflow discharges are handled after their delivery, and how material is returned by way of the auxiliary feed chamber 72, it is necessary to describe the structure of the housing 26. This housing for convenience is formed of a plurality of separable sections, these sections being numbered 79, 81, 82 and 83, and which are secured together by suitable means such as bolts. Section 79 forms a base or support, sections 81 and 82 form a volute for receiving the underflow and for effecting a return of a portion thereof back into the auxiliary feed chamber 72, while section 83 serves to support the journal 37 of shaft 34. The volute formed by sections 81 and 82 includes an annular chamber 84 which surrounds the discharge nozzles 39. It also includes passages 86 extending upwardly and inwardly and which are separated by webs 87. The upper ends of passages 86 communicate with the upper end of a depending conduit 88, the lower end of which is disposed within the auxiliary feed chamber 72.

Referring to Figure 4, a portion of the underflow discharged into annular chamber 84 can be diverted from the apparatus through a port 91 and manually adjustable valve 92. The particular form of valve 92 illustrated consists of a ported sleeve 93, forming a cylinder adapted to receive the sliding valve plug 94. Valve plug 94 can be adjusted by turning stem 96, to more or less restrict flow of material through the valve. Also communicating with passages 86 there is a pipe 97 whereby additional fluid material can be intermixed together with a portion of the underflow for return to the auxiliary chamber 72.

Disposed within the lower housing section 79 there is a receiving vessel 98 formed to provide a plurality of annular compartments 99, 101 and 102. To facilitate attachment and removal of this receiving vessel, means is provided as shown in Figure 5. In this case, the upper edge of the outer wall of receiving vessel 96 is provided with a rim 105 adapted to be engaged by cam member 103. Cam member 103 is mounted eccentrically upon a shaft 104 which is journaled within a bushing 106, this bushing being in turn mounted in the side wall of housing section 79. A handle 107 is secured to the outer end of shaft 104, to enable manual turning movements to engage or disengage member 103 with rim 102. It is preferable to provide a plurality of such devices spaced about the housing section 79 so that the upper edge of the receiving vessel can be rightly engaged with a seating ring 108.

The outer receiving vessel compartment 99 is adapted to receive underflow material flowing through valve 92, and from this compartment the material can be removed through an outflow opening 109. The inner compartment 101 receives the overflow material being discharged over weir 42 and from this compartment the material can be removed through opening 111. Extending upwardly from the center of the receiving vessel 98 and within the inner compartment 102, there is a conduit 112, which, when the receiving vessel 98 is in normal position, has its upper end extending into the lower end of conical portion 56. Feed material is introduced into conduit 112 by way of pipe 113. Any spill of feed material is caught by the inner compartment 102 and can be removed by way of opening 114.

The centrifuge scheme described above is particularly efficient for the separation of materials which are difficult if not impossible to separate in ordinary centrifuge machines. For example, it will operate successfully from milled starch to effect a relatively sharp separation between the starch particles and the gluten. This operation can be briefly described as follows: Assuming operation upon milled starch, the feed material is introduced by way of conduit 112, into the interior of the inverted conical portion 56. As the feed material moves upwardly through the interior of portion 56, by virtue of centrifugal force, a preliminary classification takes place. From this preliminary classification the heavier classified material is discharged from chamber 57, through ducts 58, upon the inner surface of the conical wall portion 66. The lighter component resulting from this preliminary classification flows through ducts 61 and 59, through annular orifice 64, and then into the centrifuge chamber portion 69. The heavier starch particles move towards the periphery of centrifuge chamber and through the orifice 68. The lighter centrifugally separated gluten flows toward the center of rotation and discharges over weir 42. The underflow consisting principally of starch particles together with water, discharges continually through nozzles 39, and by virtue of kinetic energy in the discharge, a portion of the underflow is caused to flow upwardly and inwardly through passages 86, and to be re-delivered into auxiliary feed chamber 72. The remainder of the underflow is diverted through valve 92, to the outer receiving vessel compartment 99. That portion of the underflow which is returned into the auxiliary feed chamber 72, flows outwardly through passages 73, and is discharged into the outer portion 71 of the centrifuge chamber. The material in the outer chamber portion 71 is in violent agitation, thus preventing clogging of the discharge nozzle 39 and scouring the adjacent walls. Wall portion 66 serves to isolate this zone of violent agitation from the inner portion 69 of the centrifuge chamber where centrifugal separation takes place.

In connection with the proportioning and functioning of nozzles 39 the following may be noted:—Not only should the orifices 41 of these nozzles be of sufficient size to prevent clogging by the underflow, but in addition, chamber portion 71 together with the discharge nozzles should be arranged to form efficient expelling means for the underflow. This is done in the preferred form of my invention by making the volumetric capacity of chamber 71 so small in proportion to the area of orifices 41, that the solids carried in the underflow have no opportunity to settle out, but are hurled into nozzles 39 due to the difference in speed between the material in chamber portion 71 and the walls of the same. Such difference in speed is caused by the issuing of material from the outer ends of passages 73 at less circumferential speed than the circumferential speed to which it is brought when entering nozzles 39.

An important result of the above arrangement is the ability to secure uniform circumferential distribution of fresh liquid from the return material, which is caused to enter chamber 69, when the method claimed in application Serial Number 483,874 is employed. Such uniform distribution occurs by virtue of thorough intermixing of fresh liquid introduced by way of pipe 97, with the returned underflow material, as such liquid and returned material are both delivered in chamber portion 71, before the wash liquid finds its way into chamber portion 69. If it were attempted to deliver the fresh liquid to the annular opening 69 without previously mixing it with the returned underflow, the fresh liquid would enter chamber portion 69 at spots or localized areas, instead of uniformly, and would thus cause the fresh liquid to pass through chamber portion 69 without properly acting upon the feed material being treated.

Another important result of the arrangement described above, is the fact that due to the swirling and racing motion of the material in chamber portion 71, the annular opening 68 is kept clear of settled out solid materials. In case solid material were settled or separated out in chamber portion 71, cone shaped open spaces would tend to form around the inflow ends of nozzles 39, to seriously affect the capacity of the centrifuge to handle solids.

A further factor in the functioning of nozzles 39, is their coordination with the return circuit through passages 86. Thus, it may be considered that the liquid issuing from openings 41 of nozzles 39 consists of two items. The first item is that part of the feed which ultimately issues from outlet 109 of receiving vessel 98, and which part equals exactly the amount of underflow taken from the feed. The second item is that part of the material which is returned to the rotor by way of passage 86. Therefore as great a quantity of material enters the rotor for the second item, as the quantity which leaves the rotor as the second item. Because of this characteristic whatever part of the underflow is returned to the rotor is returned automatically in correct amounts to compensate for varying conditions within the rotor. The desirability of this will be evident when it is considered that unless the returned amount equals the amount issuing from the nozzles as the second item, a discrepancy will arise which will finally upset separating conditions in the rotor. It is to secure this automatic regulation that no quantitative flow regulating means is employed in connection with the return circuit, so that variations in the underflow are reflected in compensating variations in the material returned to the rotor.

Now referring again to Figure 1, it can be assumed that the centrifuge illustrated in Figures 3 to 5 inclusive, is utilized for the centrifuge shown diagrammatically and indicated at 10. The introduction of feed material indicated by line 11 in Figure 1, corresponds to the conduit 112 in Figure 3. The overflow indicated by line 13 corresponds to the weir 42 of Figure 3, or to the opening 111. The closed return circuit for a portion of the underflow material indicated by line 21, corresponds to the volute formed by chamber 84, and passages 86 which serve to return a portion of the underflow to the auxiliary feed chamber 72. Diversion of a portion of the underflow from the centrifuge apparatus 10 to feed centrifuge 14, takes place through part 91 and valve 92. Re-introduction of underflow from apparatus 14, indicated by line 17, into the closed circuit indicated by line 21, corresponds to introduction by way of pipe 97 in Figure 3.

Ignoring apparatus 14 for the present, and considering only centrifuge 10, feed material such as mill starch is introduced into the centrifuge chamber as indicated at 11, the overflow 13 will consist of gluten together with a part of the water of feed, while the underflow 12 will consist mainly of starch particles with the remainder of the water of the feed. This split of the water between the underflow and overflow can be varied between certain limits by varying the adjustments of the centrifuge, although there is a definite maximum limit to the amount of water which can be removed together with the underflow. Obviously the greater amount of water removed together with the underflow, the less water will be removed in the overflow. It is for the purpose of carrying dewatering of the overflow beyond the practical limits that our above described centrifuge can accomplish of itself, that we utilize in our method the additional step accomplished by the centrifuge 14 or equivalent means. Assuming that this apparatus 14 is likewise a centrifuge, that is like that described with reference to Figures 3 to 5 inclusive, that portion of the underflow removed from centrifuge 10 serves as a feed for centrifuge 14, and therefore the underflow of centrifuge 14 is of substantially higher specific gravity than the underflow of centrifuge 10. A portion of this concentrated underflow from centrifuge 14 is directly returned thereto to secure proper operation of the same. The other portion of the underflow is split into two parts, one being for final discharge as indicated at 18, and the other being for reintroduction into machine 10.

Obviously, the material re-introduced into centrifuge 10 as indicated by line 21 is a mixture of a part of the underflow from this machine and a part of the more concentrated underflow from machine 14. Therefore, the reintroduced mixture is of relatively higher specific gravity than the underflow from centrifuge 10; in other words, the underflow returned back into the chamber of centrifuge 10 has been loaded with starch particles. The net result of this method is to materially decrease the water in the overflow 13, and this overflow has been dewatered to a marked degree. What takes place within the centrifuge chamber is that the added starch particles in effect squeeze out water from the flocculated gluten colloid, and the squeezed out water discharges with the starch.

With the method described with reference to Figure 1, it is possible to utilize various types of apparatus in place of the centrifuge 14 constructed like the centrifuge of Figures 3 to 5 inclusive. The step to be accomplished by centrifuge 14 is of course to effect removal of water from the underflow of centrifuge 10 and to load the material returned to centrifuge 10 with starch particles. Aside from the utilization of various concentrating or classifying methods for this step, it is also possible to load the return to centrifuge 10 with starch particles obtained from an independent source.

While the above method described with reference to Figure 1 can be used with advantage in various industrial systems or processes, where it is desired to produce an overflow having a minimum water content, particularly where the overflow contains colloidal material like flocculated gluten, its application is also desirable in the novel system for manufacture of cornstarch, illustrated diagrammatically in Figure 2. In this diagram conventional steeping vats are represented at 121, while lines 122 and 123 indicate introduction of sulphur dioxide ($SO_2$) and Indian corn. Line 124 indicates introduction of waters originating from the gluten overflow, as will be presently described. Conventional crushers or crackers are represented at 126 to receive the underflow from steeps 121. Overflow from the steep vats 121 is removed for introduction into the feed water evaporator, as indicated by line 127. The ground material from crackers 126 is introduced into a settler or classifier 128. A series of copper shaker screens 137 receive the overflow from settler 128, while the underflow is removed as indicated by line 131 and treated by serially connected copper and silk screen shakers 132 and 133. The feed material from shaker 123 is removed as indicated by line 134, and constitutes a part of the mill starch produced by the system. Fibrous material screened out by shakers 132 and 133 is removed by line 136.

The copper screen shakers 137 receive material from settlers 128 which are commonly referred to as "germ separators". The last of the series of shakers 137 delivers screened out material to the germ expeller or squeezer 138 from which germ ladened material is delivered to the germ dryers as indicated by line 139. As indicated by lines 141 and 142, the minor material from intermediate shakers of series 137 is returned to the settler 128. Likewise, line 143 indicates return of starch bearing material from the last shaker 137 to the feed of the second shaker 137, while line 144 indicates the return of separated material from the expeller 138 to line 143.

The screened out grit material from shakers 133, removed by line 136, is introduced into grinders 146, commonly known as "Buhr mills".

The ground material from these mills is introduced into a series of copper screen figures 147, generally known as "slop shakers". The screened out material from the last of the series of shakers 147 is introduced (line 148) into a slop moisture expeller 149. Line 151 indicates removal of coarse slop to the driers. Lines 152, 153 and 154 indicate return of starch bearing material back to preceding shakers for retreatment. Line 156 indicates return of waters from the expeller 149 to return line 154 for retreatment.

The starch bearing material from the first of the shakers 147 is treated in a further series of silk screen shakers 158, as indicated by line 157. Starch bearing material from the first two of the shakers of this series constitutes mill starch and is merged with the flow from shaker 133, as indicated by line 161. The screened out material from the last of shaker series 158 is introduced into a slop press 162 from which the dewatered fine slop is removed as indicated by line 163 to suitable driers. Eliminated water from press 162 is returned by line 164 and introduced as a part of the feed into the last shaker of series 158.

For treatment of the mill starch, centrifuges 10 and 14 are employed with connections substantially as shown in Figure 1, that is, mill starch from 161 is introduced into feed line 11 for centrifuge 10. Before introduction into the centrifuge, the milled starch can be stored to secure a more constant feed. Gluten overflow from line 13 is thickened by suitable apparatus such as centrifuge 166 like centrifuge 10. The thickened underflow from centrifuge 166 is introduced into gluten filter presses 167 and the waters from the presses, which still contain some soluble gluten together with other material, are reintroduced into the steeping vats 121 as indicated by line 168.

The overflow from centrifuge 14 can be returned to other parts of the system. For example, line 19 is shown delivering this overflow to vats 171 and 172. Additional fresh water can be introduced into vat 172 as indicated by line 173. Line 174 indicates utilization of the liquors from vat 171 in the crackers 126, in mills 146 and settler 128. Lines 176, 177 and 178 indicate utilization of liquor from vat 172 for the last one of shakers 137, the last of shakers 158, and the last one of shakers 147. A part of the material being returned through line 153 of shakers 147 is also shown diverted to vat 171 by line 181. The material introduced into the system by line 174 constitutes light starch. To assist operation of centrifuge 14, wash water is preferably introduced into its underflow return as indicated at 181, to secure better separation. In this connection, note that centrifuge 14 can be operated in the manner disclosed and claimed in our copending application Serial Number 483,874, that is to effect a counterflow of a portion of the water from the return, through the centrifuge chamber, thus securing more efficient operation.

In operating a system of Figure 2, centrifuges 10 and 14 are so adjusted that the water contained in the overflow is substantially that required for the steeping vats 121. In other words, all of the water required for the steeping vats 121 can be made up by liquor introduced through the lines 168, with substantially no excess of this liquor to be wasted or to be treated for further utilization. Because of the more efficient separation effected by centrifuges 10 and 14, the starch produced by the system of Figure 2 is of relatively high quality compared to starch produced by prior systems, due largely to the more efficient separation effected by the use of centrifuges.

We claim:

1. In a method of the character described characterized by the use of centrifuge apparatus, the steps of supplying hydrous fluid feed material to said apparatus containing components of different classifying characteristics, establishing both an overflow and an underflow discharge from said apparatus, concentrating a portion of the underflow, and returning said concentrated portion of the underflow back into the apparatus to effect dewatering of the overflow.

2. In a method of the character described characterized by the use of a centrifuge chamber having provision for the separate discharge of an underflow and an overflow therefrom, said method comprising the steps of supplying hydrous fluid feed material to said chamber containing components of different classifying characteristics, thereby establishing an underflow and an overflow discharge therefrom, concentrating a portion of the underflow, and returning said concentrated portion of the underflow back into said chamber to effect dewatering of the overflow.

3. In a method of the character described for treatment of mill starch, characterized by the use of centrifuge apparatus, the steps of feeding mill starch into the separating apparatus, establishing a gluten overflow and a starch underflow from said apparatus, concentrating a portion of the underflow, and returning said concentrated underflow portion to the apparatus to effect dewatering of the gluten overflow.

4. In a method of the character described for treatment of mill starch, characterized by the use of centrifuge apparatus, the steps of feeding mill starch into the separating apparatus, establishing a gluten overflow and a starch underflow from said apparatus, increasing the concentration of starch particles in a portion of the underflow, and returning said underflow portion to the apparatus to effect dewatering of the gluten overflow.

5. In a method of the character described for treatment of mill starch, characterized by the use of a centrifuge chamber having provision for discharge of a gluten overflow and a starch underflow therefrom, said method comprising feeding mill starch into said chamber whereby a gluten overflow and a starch underflow is established, increasing the concentration of starch particles in a portion of the underflow, and returning said underflow portion to the apparatus to effect dewatering of the gluten overflow.

6. In a method of the character described, characterized by the use of a centrifuge chamber, the steps of continuously supplying a hydrous fluid feed material containing a colloid and suspended solid particles to such chamber, whereby the material is subjected to centrifugal force, continuously and separately removing centrifugally separated components from said chamber, one component containing principally the solid particles of the feed and the other the colloid, and continuously dewatering the colloid being removed from said chamber, by continuously introducing solid particles into said chamber of substantially the same classifying characteristics as the solid particles of the feed.

7. In a method of the character described, characterized by the use of a centrifuge or like separating apparatus, the steps of supplying hydrous fluid feed material to said apparatus whereby it is subjected to separating forces, establishing an underflow and an overflow discharge from said apparatus, and effecting dewatering of the overflow by introducing into said apparatus another fluid material containing a greater percentage of heavier material than the underflow.

8. In a method of the character described, characterized by the use of centrifuge apparatus, the steps of supplying hydrous fluid feed material to said apparatus containing components of different classifying characteristics, establishing both an underflow and an overflow discharge from said apparatus, and effecting dewatering of the overflow by reintroducing a part of the underflow back into the apparatus.

9. In a method of the character described for treatment of starch liquor containing solid starch particles together with gluten, or for like materials, characterized by the use of a centrifuge chamber, the steps of continuously supplying said liquor to said chamber, continuously and separately removing centrifugally separated starch and gluten components from said chamber, and continuously dewatering the gluten components being removed from said chamber, by continuously introducing additional aqueous fluid material containing solid particles into said chamber, the solid particles of said additional fluid material having substantially the same classifying characteristics as the starch particles of said liquor, and the water content of said additional fluid material being less than the water content of the starch liquor.

10. In a method of the character described for the separation of starch from gluten, characterized by the use of a centrifuge or like apparatus having a zone of separation, the steps of supplying starch and gluten to said apparatus, establishing a continuous starch underflow and a gluten overflow discharge from said apparatus, and effecting dewatering of the gluten overflow by establishing a return of a part of the discharge back into the apparatus and by removing water from a part of the starch being introduced into the apparatus, said last-mentioned removal of water being carried out external to the zone of separation.

ALBERT PELTZER.
ALBERT PELTZER, Jr.